Dec. 3, 1957 A. L. LEETH 2,814,830
APPARATUS FOR REPAIRING TIRES
Filed Nov. 5, 1954 2 Sheets-Sheet 1
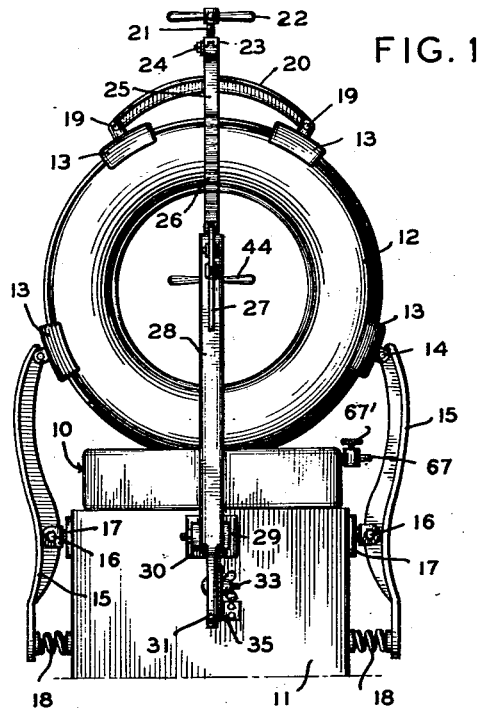
FIG. 1
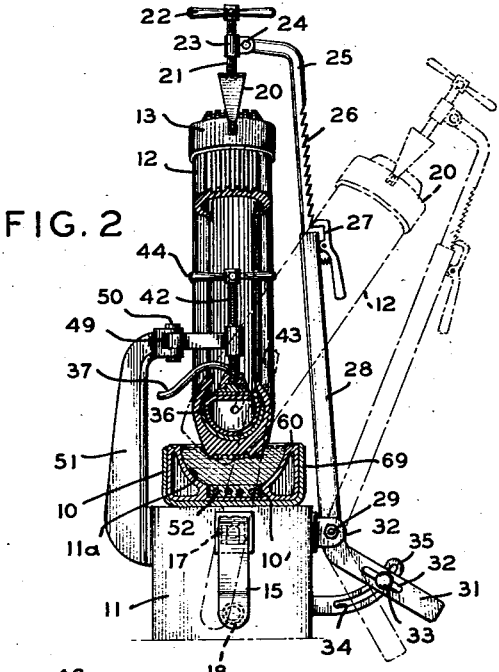
FIG. 2
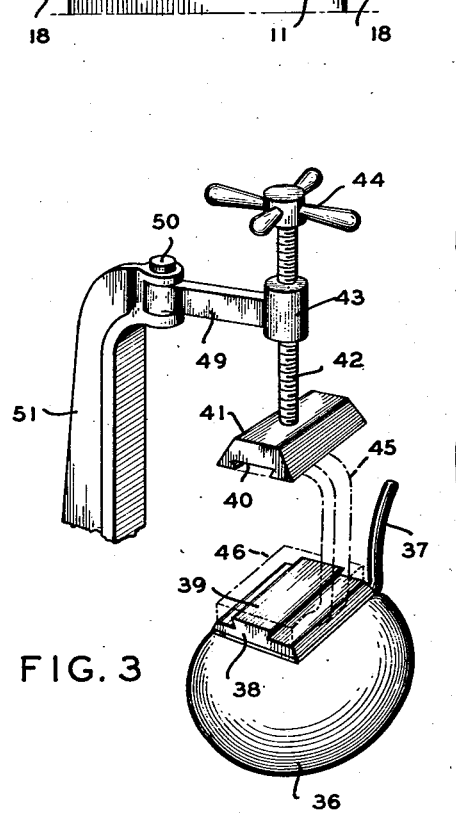
FIG. 3
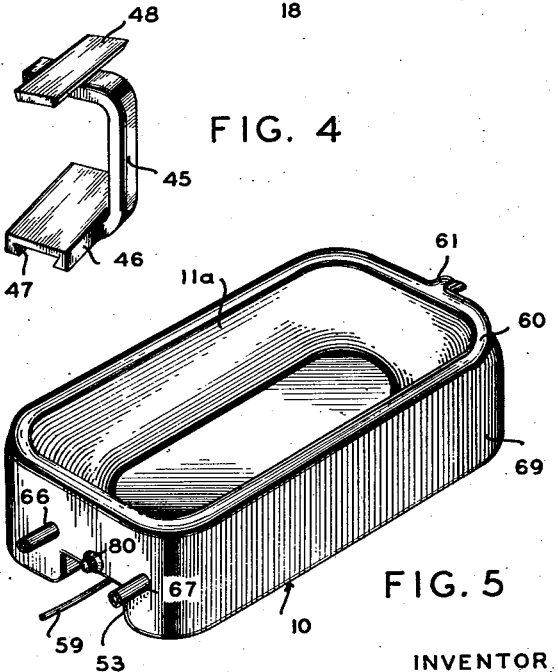
FIG. 4
FIG. 5
INVENTOR
ASHBY L. LEETH
BY *A. Yates Dowell*
ATTORNEY Dec. 3, 1957  A. L. LEETH  2,814,830
APPARATUS FOR REPAIRING TIRES
Filed Nov. 5, 1954  2 Sheets-Sheet 2
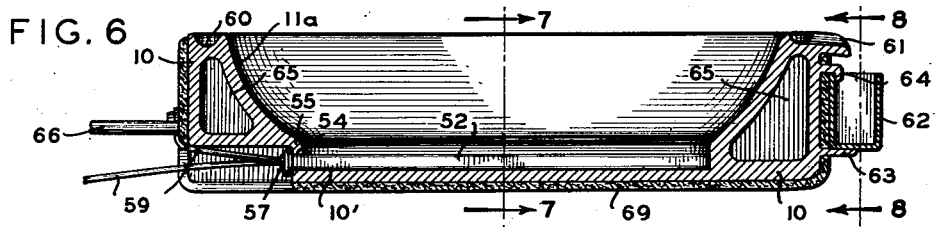
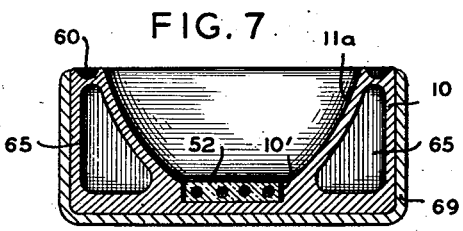
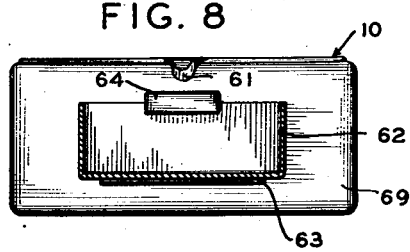
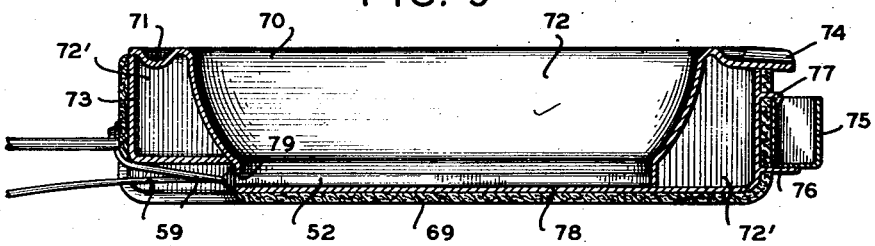
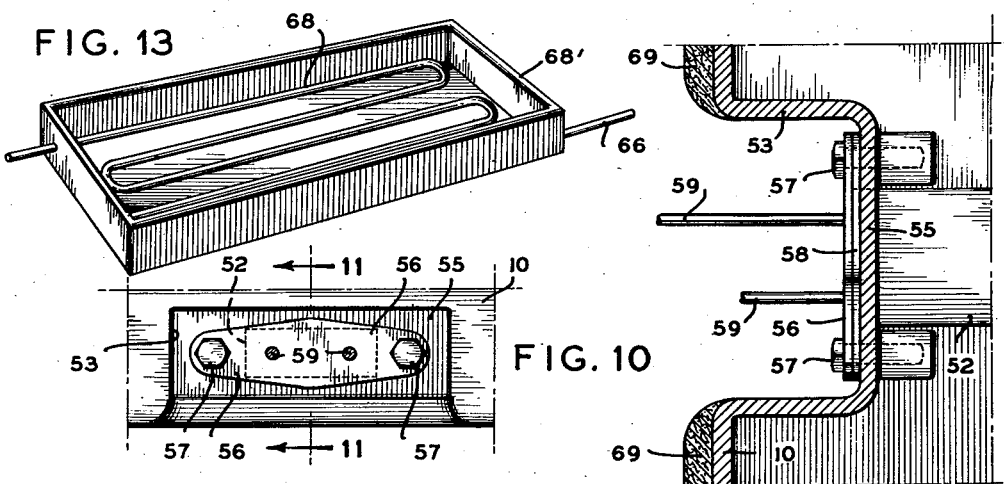
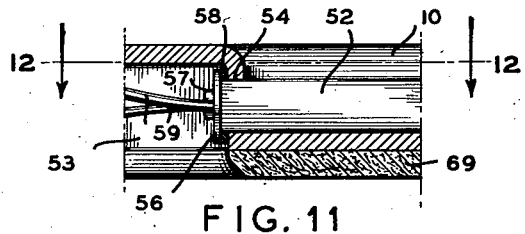
INVENTOR
ASHBY L. LEETH
BY
ATTORNEY United States Patent Office 2,814,830
Patented Dec. 3, 1957

2,814,830

APPARATUS FOR REPAIRING TIRES

Ashby L. Leeth, Washington, D. C.

Application November 5, 1954, Serial No. 467,044

2 Claims. (Cl. 18—18)

This invention relates to rubber and other substances of a generally similar character and to products created therefrom including pneumatic tires used on automobiles and other vehicles and to the repair of such tires by vulcanization.

Repairs to pneumatic tires frequently have been made without regard to their external configuration and appearance with the result that repaired portions have been different in appearance from the remainder of the tire and the making of these repairs has presented numerous other problems, including, among other things, the manner, time required, and effectiveness of the work.

It is an object of the invention to overcome the problems above enumerated and to provide simple, inexpensive equipment for easily and quickly repairing a tire with minimum alteration of its appearance, strength, weight distribution and the like.

Another object of the invention is to provide equipment of the character indicated capable of being used for vulcanizing either the central or sidewall portions of the tire with quick adjustment from one to the other, as well as equipment for performing the task in a minimum of time.

A further object of the invention is to provide equipment of the character indicated in which a negative of the surface or tread of the tire is produced in a matrix with means for accelerating and cooling the same so that such matrix may be employed in the vulcanizing process.

Other objects and advantages of the invention will be apparent from the following description taken in conjunction with the accompanying drawing wherein:

Fig. 1 is a side elevation illustrating one application of the invention;

Fig. 2, a vertical section at right angles to the view of Fig. 1;

Fig. 3, an enlarged fragmentary detail perspective of an airbag used on the inside of the tire for applying pressure therein;

Fig. 4, an enlarged detailed perspective of a C-bracket, shown in dotted lines in Fig. 3, for applying pressure when the tire is turned at an angle;

Fig. 5 a perspective of the melting pot in which the negative matrix is produced;

Fig. 6, a longitudinal section through the melting pot;

Fig. 7, a transverse section on line 7—7 of Fig. 6;

Fig. 8, a vertical section on the line 8—8 of Fig. 6;

Fig. 9, a vertical section similar to Fig. 6 of a slightly modified form of the invention;

Fig. 10, a fragmentary end elevation of the structure of Fig. 6 disclosing the exterior of the heating unit;

Fig. 11, a vertical section on the line 11—11 of Fig. 10;

Fig. 12, a horizontal section on the line 12—12 of Fig. 11; and

Fig. 13, a perspective of a unit for cooling.

Briefly stated, the invention comprises a vulcanizer including a melting pot or receptacle in which the tire to be vulcanized is placed, such melting pot being adapted to contain soft metal such as an alloy of lead and tin which can be melted at a low temperature and into this molten metal is placed the tread of a tire from which a negative matrix is produced for use in vulcanizing the damaged portion of a tire so that such portion after vulcanization will have the same surface configuration as the remaining portion of the tire.

The vulcanizer is provided with arms for engaging and holding the tire in position during vulcanization as well as with inflatable pressure applying means for exerting force within the tire including a C-bracket to facilitate application of the proper pressure within the tire when it is tilted during vulcanization of a portion of the side wall in a manner similar to that in which the tread is vulcanized.

The low temperature melting of the alloy of tin and lead or the like may be heated in a desired manner, as, for example, by means of a heating element inserted endwise through an opening in the lower end portion of the melting pot. This heating element may be supplied with heat, as for example, electrically, and be controlled by a thermostat, or it may be supplied with heat in any other desired manner.

With continued reference to the drawings, the vulcanizer of the present invention includes a melting pot 10 having a curved inner wall 11a forming a cavity in which a tire 12 to be vulcanized is adapted to be placed, such tire being engaged by supporting clamps 13 connected by pivots 14 to supporting arms 15 mounted by means of pivots 16 on brackets 17 attached to the base 11. The lower ends of the arms 15 are urged outwardly by springs 18 so that the clamps 13 press against the tire 12.

The tire 12 is engaged at its top by similar clamps 13 connected by pivots 19 to a curved bar or yoke 20 swivelly connected to a screw 21 provided with an operating head or handle 22. A threaded sleeve 23 (Fig. 2) is mounted on the screw 21 and is secured by a pivot 24 with an arm 25 provided with ratchet teeth 26 for engagement by a spring pressed latch 27 mounted on an arm 28 secured by a pivot 29 to a bracket 30 fixed to the base 11. The arm 28 has an angular extremity 31 and a slot 32 in which is disposed a wing nut bolt 33 which is also located in a slot 34 in a curved bracket 35 attached to the base 11. By turning the handle 22 the screw 21 can be rotated to raise and lower the yoke 20 to apply pressure on the upper portion of the tire 12, and due to the arms 25 and 28 and the ratchet and latch connection between them, the tire may be tilted as shown in dotted lines in Fig. 2.

In order to apply pressure to the interior of the tire a pneumatic airbag 36 is provided to which air can be supplied through a tube 37, such airbag having a cap 38 with a dovetail 39 adapted to be received in a corresponding recess 40 in a clamping member 41 swivelled on the end of a screw 42 mounted in a supporting sleeve 43. The screw 42 is provided with an operating head 44 so that when the screw is rotated, pressure can be transmitted to the airbag 36 by direct contact between the dovetail members 39 and 40 or by means of an intermediate C-bracket 45 having a base member 46 with a dovetail recess 47 for receiving the dovetail 39. On its upper portion the bracket is provided with a dovetail projection 48 for location within the dovetail recess 40. The C-bracket is intended to be used when the tire is disposed at an angle, as shown in dotted lines in Fig. 2, in order to vulcanize the side wall, the C-bracket providing space for the turning of the tire.

The sleeve 43 in which the screw 42 is supported is carried by an arm or bracket 49 connected by a pivot 50 with a supporting arm or bracket 51 fixed to the base 11. The pivot 50 permits the pressure applying means to be swung from operative to inoperative position and vice versa.

The melting pot or receptacle 10 in which the tire is vulcanized is required to withstand a temperature of 400° F.; and, consequently, it can be cast as illustrated in the earlier figures, or it can be made from sheet material as illustrated in Fig. 9.

Within the melting pot is a soft metal such as an alloy of lead and tin which can be melted at a low temperature, and into this molten mass is placed the undamaged portion of the tread or side wall of a tire to be repaired in order to produce a negative matrix for use in vulcanizing the damaged portion of the tire and so that after vulcanization such portion will have the same surface configuration as the remaining portion of the tire.

In order to supply the necessary heat the pot is provided with a recess 10' in its bottom for the reception of a heating element 52 (Fig. 2). The pot is also provided with an opening 53 in its end and an additional opening 54 in a vertical wall 55 affording access directly into the interior of the pot. The heating element is provided on its outer end with a head or cap 56 (Figs. 10 and 11) having a screw 57 through each end fastening the same to the pot and with a gasket 58 behind the same. Energy is supplied to the heating element through conductors 59.

It is desired to keep the temperature within the pot constant prior to placing a tire therein, to rapidly cool the molten metal to cause it to retain the shape of the surface configuration of the tire, and to provide for the discharge of any excess metal which might overflow and be discharged from the pot. Accordingly, the pot is provided with a depressed trough portion 60 around its upper edge having a discharge lip 61. In order to catch molten metal discharged from the lip 61 a container or receptacle 62 is provided, and to fasten this receptacle in position a lower ledge 63 and an upper hook 64 are provided. The receptacle can be applied and removed by tilting it slightly to locate its upper edge beneath the hook 64 and position the base upon the ledge 63. Thus, metal overflowing will be collected in the receptacle 62.

In order to cool the pot it is provided with a cooling channel 65 through which cool air is caused to flow for producing reduction in temperature of the metal within the pot causing the latter to solidify and produce the negative matrix. As shown in Fig. 5 air may be admitted through a tube 66 and discharged through a tube 67; and if desired, tube 66 may be connected to a cooling coil 68 in a receptacle 68' (Fig. 13). Water ice or carbon dioxide ice may be placed on the coil 68 for cooling the air passing through such coil. An air valve 67' (Fig. 1) may be employed in the line 67 for controlling the flow of air through said coil. Insulation 69 may be attached to the exterior of the pot in order to retard heat transfer.

In Fig. 9 is disclosed a melting pot of stamped or pressed metal including a sheet 70 having a trough 71 and a cavity 72 with a second sheet 73 forming the outer and bottom wall of the pot. When the sheets 70 and 71 are combined an air passage 72' is provided corresponding to the air passage 65 and for a similar purpose a drainage lip 74 is provided as well as a receptacle 75 for collecting excess metal, which receptacle is supported by a ledge 76 carried by the outer member 73 and an upper retaining hook 77 corresponding to hook 64 of Fig. 6.

A recess 78 is provided in the bottom of this pot for the reception of the heating element 52 which can be inserted through an opening 79 in the end wall of the member 70. The heating element may be secured in position in the manner previously described.

If desired, a thermostatic or other temperature control 80 (Fig. 5) may be provided for maintaining the proper temperature of the heating element.

It will be apparent from the foregoing that a vulcanizer is provided in which a negative matrix may be easily and quickly produced and the vulcanizing accomplished immediately thereafter with the vulcanized portion given the same configuration as the adjacent unrepaired portion of the article and therefore like new.

It will be obvious to those skilled in the art that various changes may be made in the invention without departing from the spirit and scope thereof, and therefore the invention is not limited by that which is illustrated in the drawings and described in the specification, but only as indicated in the appended claims.

What is claimed is:

1. Structure for taking an impression of a portion of the tread of a tire and for repairing another portion of the tire including a reproduction of the portion of the tire from which the impression was taken comprising a receptacle of a construction to hold metal either in solid or liquid state and capable of withstanding heat necessary to reduce metal to molten condition, heating and cooling means for said receptacle, said heating means being sufficient to reduce metal within the receptacle to molten condition, controlling means for the heat supplied by said heating means, said cooling means being sufficient to change said molten metal to solid from a liquid state, said heating means being of a character to heat the metal to make an impression from the tire and subsequently to produce vulcanization.

2. A device for repairing a pneumatic tire comprising an upwardly open container capable of holding metal in liquid or solid condition and of withstanding heat necessary to reduce such metal to molten condition, heat means in intimate association with the inner wall surface of said container for supplying heat for reducing to a molten state in the container for obtaining an impression of the tread of a portion of a tire another portion which is to be repaired, control means for the heat supplied by said heating means, means for quickly cooling the metal in the container, means for maintaining a tire to be repaired in a definite position in said container notwithstanding the rotational relation of the tire to said container, said device being usable for producing a mold with a surface corresponding to an undamaged portion of a tire to be repaired and then the mold used in repairing the damaged portion of the same tire so that it will have a configuration corresponding to that of the undamaged portion thereof.

References Cited in the file of this patent

UNITED STATES PATENTS

| | | |
|---|---|---|
| 1,011,860 | Schwentker | Dec. 12, 1911 |
| 1,380,320 | Hufford | May 31, 1921 |